(12) United States Patent
Shah et al.

(10) Patent No.: US 10,949,089 B2
(45) Date of Patent: Mar. 16, 2021

(54) RECONFIGURING DATA OBJECTS USING BATCH PROCESSING OF CONCATENATED COMPONENTS

(71) Applicant: VMware, Inc., Palo Alto, CA (US)

(72) Inventors: Varun Shah, Fremont, CA (US); Mansi Shah, San Jose, CA (US); Vishnu Rajula, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/442,889

(22) Filed: Jun. 17, 2019

(65) Prior Publication Data

US 2020/0393969 A1  Dec. 17, 2020

(51) Int. Cl.
*G06F 3/06*  (2006.01)

(52) U.S. Cl.
CPC .......... *G06F 3/0608* (2013.01); *G06F 3/0631* (2013.01); *G06F 3/0689* (2013.01)

(58) Field of Classification Search
CPC ......... G06F 3/0613; G06F 3/0638; G06F 7/00
See application file for complete search history.

(56) References Cited

U.S. PATENT DOCUMENTS

| | | | | |
|---|---|---|---|---|
| 9,135,136 B2* | 9/2015 | De Schrijver | ...... | G06F 11/1076 |
| 10,419,931 B1* | 9/2019 | Sohail | ................ | H04L 63/1425 |
| 2008/0104355 A1* | 5/2008 | Moore | .................. | G06F 3/0607 711/170 |
| 2008/0201336 A1* | 8/2008 | Yamato | ................... | G06F 16/10 |
| 2009/0113153 A1* | 4/2009 | Yamamoto | .......... | G06F 11/1471 711/162 |
| 2011/0040795 A1* | 2/2011 | Gordon | ................. | G06F 3/0644 707/792 |
| 2013/0311719 A1* | 11/2013 | Doedline, Jr. | ........ | G06F 3/0638 711/114 |
| 2014/0307734 A1* | 10/2014 | Luby | ..................... | H04L 65/608 370/390 |

* cited by examiner

*Primary Examiner* — Getente A Yimer

(57) ABSTRACT

The disclosure herein describes reconfiguring a data object in a data store using batch portions of components of the data object. Instructions to reconfigure the data object to a target object layout are received, the data object including a concatenation layer that references a plurality of components. The components are grouped into batch portions and the batch portions are reconfigured in a series based on the received instructions. The reconfiguring for each batch portion includes allocating free storage space according to the target object layout as target components, copying the data stored in the batch portion to the target components, redirecting references in the concatenation layer from the components of the batch portion to the target components, and releasing storage space occupied by the components of the batch portion. As a result, storage space used as transient capacity during the reconfiguring is reduced to a size of the batch portions.

20 Claims, 8 Drawing Sheets

RECONFIGURING DATA OBJECTS USING BATCH PROCESSING OF CONCATENATED COMPONENTS

BACKGROUND

In modern storage systems, such as object-based, hyper-converged infrastructure (HCI) systems, large quantities of data are stored in data objects, containers, or the like, and the data stored therein is organized and/or arranged based on defined data storage policies. In some instances, such as when a data storage policy associated with data objects in a data store is changed, the storage system reconfigures the affected data objects by allocating storage space equal to the size of the affected data object for a target data object that conforms with the policy change, copying the data of the affected data object to the target data object, and then releasing the storage space occupied by the affected object. During reorganization of a large data object, substantial storage space resources are consumed as transient capacity (e.g., during reconfiguration of a 1 TB data object, 2 TB of storage space is occupied in the data store). Consumption of such large quantities of storage resources can negatively affect the performance of other applications on the system that need to share the same storage space.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for reconfiguring a data object in a data store based on batch portions of components of the data object is described. Instructions to reconfigure the data object to a target object layout in the data store are received, wherein the data object includes a concatenation layer that has references to a plurality of components, wherein each component of the plurality of components is configured to store a portion of data of the data object. The plurality of components is grouped into one or more batch portions of components and the one or more batch portions of components are reconfigured in a series based on the received instructions, wherein one of the batch portions of components is reconfigured at a time. The reconfiguring for each batch portion of components includes allocating a free storage space portion according to the target object layout as target components of the batch portion, wherein sizes of the target components are based on data capacity sizes of the components of the batch portion of components, copying the portions of data stored in the components of the batch portion of components to the target components, redirecting references in the concatenation layer to the components of the batch portion of components from the components to the target components, and releasing storage space occupied by the components of the batch portion of components and the portions of data stored in the components. As a result, storage space used as transient capacity during the reconfiguring is reduced to a storage space size of the batch portions.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
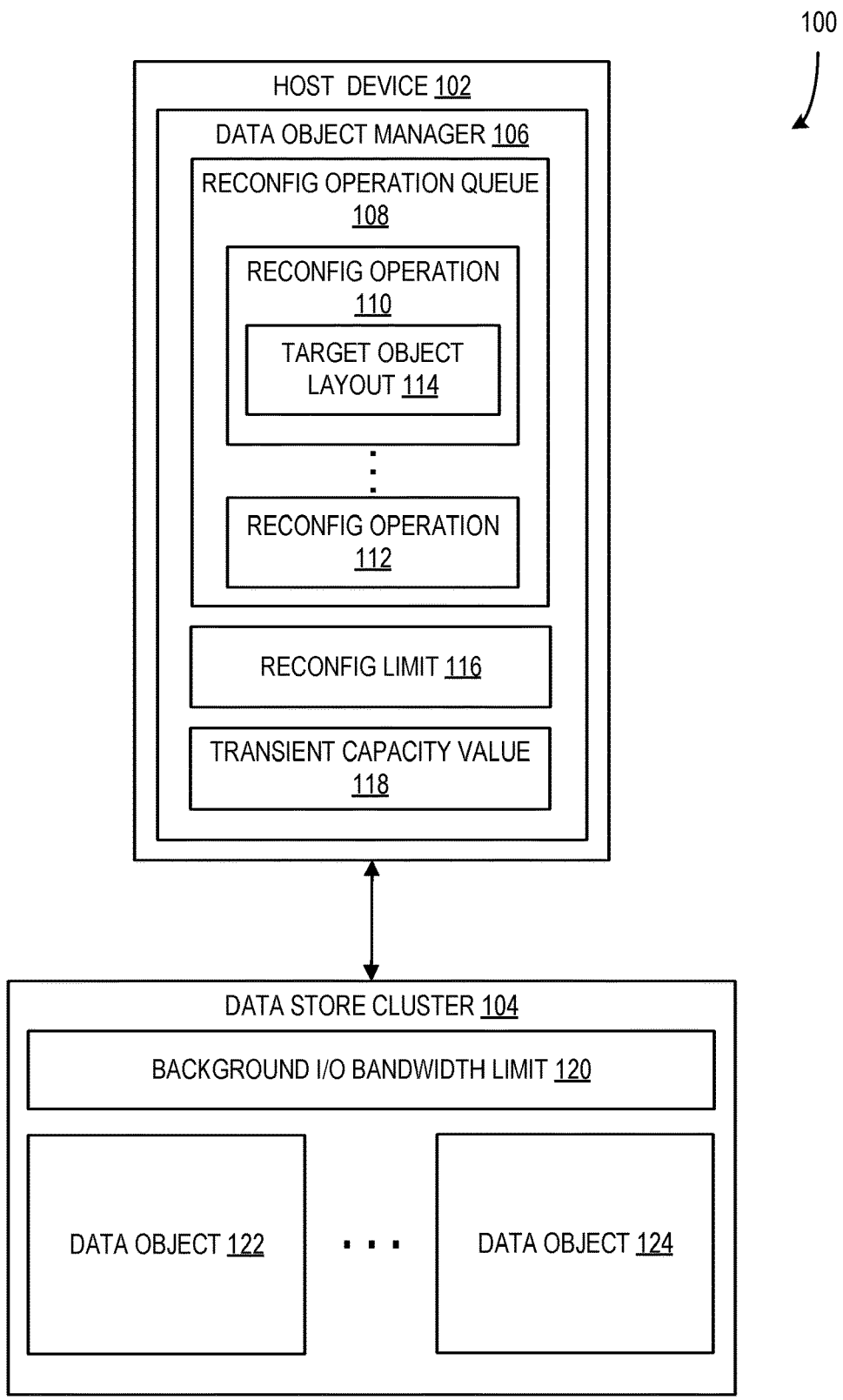
FIG. 1 is a block diagram illustrating a system configured for reconfiguring data objects in a data store cluster according to an embodiment.

Aspects of the disclosure provide a computerized method and system for reconfiguring a data object in a data store with reduced consumption of transient capacity of the data store. Based on receiving instructions to reconfigure a data object to a target object layout in the data store, each component of the data object is reconfigured. The data object includes a concatenation layer that references a plurality of components, such that each component of the plurality of components is configured to store some data of the data object. The plurality of components is grouped into batch portions of components and each batch portion of components is reconfigured, one batch portion at a time, by allocating free storage space according to the target object layout to define target components, copying the data from the components of the batch portion to the target components, redirecting the concatenation layer reference of the components of the batch portion from the components to the target components, and then releasing the storage space occupied by the components of the batch portion. As a result, the storage space used as transient capacity during the reconfiguration is reduced to the size of the batch portions, rather than the size of the entire data object.

The disclosure handles reconfiguration operations that occur as a result of data storage policy changes, data structure repair processes, rebalancing of a data store, and/or other events in such a way that the amount of storage space occupied as transient capacity during the reconfigurations is substantially reduced. The disclosure operates in an unconventional way by configuring data objects to include a concatenation layer which refers to the storage components of the data object and broadly determines how to store data on those components in a concatenated manner, thereby enabling a data object manager of the data storage system to perform reconfiguration operations on a series of batches of the storage components of the data object rather than performing the reconfiguration of the data object all at once. For instance, in a system with a data object that includes 20 concatenated components for storing data, a reconfiguration operation may be performed on batches of two components at a time, resulting in ten batches of components being reconfigured in series. Rather than occupying a total of twice the amount of storage space of the data object and occupying transient capacity of the size of the data object during reconfiguration, the amount of storage space occupied is thus no more than the size of the data object plus the size of the smaller, two-component batches and the occupied transient capacity is also reduced to the size of the two-component batches as described herein. The disclosure further enables the queuing and/or scheduling of reconfiguration operations based on defined transient capacity limits, such that queued reconfiguration operations are performed and completed while a defined amount of free storage space is maintained in the storage system for use by other applications.

FIG. 1 is a block diagram illustrating a system 100 configured for reconfiguring data objects 122-124 in a data store cluster 104 according to an embodiment. The system 100 includes a host device 102 including a data object manager 106 that is configured to perform the reconfiguration operations (e.g., reconfig operations 110-112) as described herein to reconfigure the data objects 122-124. In some examples, the data store cluster 104 includes one or more distributed data stores upon which the data objects 122-124 are stored. It should be understood that the data store cluster 104 and/or data stores therein may be arranged in organizations that would be understood by a person of ordinary skill in the art without departing from the description.

In some examples, the host device 102 is a computing device that is configured for executing software programs and interacting with the data store cluster 104 such as by issuing input/output (I/O) requests to the cluster 104 to write data to distributed data stores and associated data objects 122-124 therein and/or to retrieve data from such distributed data stores and associated data objects. Further, in virtualization examples, the host device 102 is configured for executing guest systems, such as virtual computing instances (VCIs) (e.g., virtual machines (VMs), containers, or other types of VCIs) and enabling such guest systems to make use of the cluster 104 and associated data objects 122-124 for distributed data storage. Alternatively, or additionally, the host device 102 and the system 100 are generally operable in non-virtualized implementations and/or environments without departing from the description herein.

The data store cluster 104 includes hardware, firmware, and/or software configured to enable access and interactions with the data objects 122-124 by the host device 102 and/or other host devices or other computing devices. In some examples, the cluster 104 is configured to include interfaces that enable the storage of data associated with guest systems or other software applications being executed on the host device 102 in the data objects 122-124 according to distributed data storage principles, including storing files and/or data structures across multiple data stores, storing files and/or data structures redundantly on multiple data stores, accessing stored data on multiple data stores in parallel processes, etc. Further, I/O requests associated with background processes for managing and/or maintaining the data objects 122-124, such as reconfiguration operations, or "reconfig" operations (e.g., reconfig operations 110-112), are enabled via interfaces of the data store cluster 104.

Additionally, the data store cluster 104 includes a background I/O bandwidth limit 120 that indicates a maximum amount and/or percentage of the I/O bandwidth of the cluster 104 that can be used by background operations, such as reconfiguration operations and/or resynchronization operations as would be understood by a person of ordinary skill in the art. For instance, in some examples, the background I/O bandwidth limit 120 is set to 20% of the total I/O bandwidth of the cluster 104, such that reconfig and/or resync operations are prevented from using more than 20% of the total I/O bandwidth of the cluster 104 at a time, reserving the other 80% of the bandwidth for use by other programs, such as guest systems hosted on the host device 102. The limit is defined to prevent reconfig operations and/or other background processes from negatively affecting the performance of the system with respect to hosted guest system processes such as user-facing applications. The bandwidth limit 120 may be defined by technicians, engineers, or other users that maintain the cluster 104 and/or other components of the system 100. Further, a user with sufficient access to the configuration of the cluster 104 may change the limit to improve or tune the performance of the cluster 104.

While, in many described examples herein, the bandwidth limit 120 is based on limiting the bandwidth use of reconfig operations and/or associated resync operations in comparison to all other operations, in alternative examples, the set of operations that uses the I/O bandwidth of the cluster 104 is divided into more and/or different operation categories and one or more of the operation categories are assigned bandwidth limits as described herein. For instance, the operations may be split into three categories with associated bandwidth limits: background operations with a 15% bandwidth limit, low-priority user application operations with a bandwidth limit of 35%, and high-priority user application operations with a bandwidth limit of 50%. Alternatively, some of the categories may be configured to use any amount of available bandwidth (e.g., the high-priority user application operations may be configured to make use of more than 50% of the total bandwidth when possible).

The host device 102 includes a data object manager 106 that is configured for initiating, scheduling, or otherwise managing the reconfiguration operations 110-112 associated with data stored by the host device 102 and/or VCIs or other guest systems hosted on the host device 102. The data object manager 106 includes a reconfig operation queue 108 storing proposed reconfig operations 110-112 that are to be performed, a reconfiguration limit, or reconfig limit 116, and a transient capacity value 118 indicating an amount of storage capacity that is currently occupied by reconfig operations and/or other background processes of the host device 102 and/or other host devices in the system 100. In some examples, the data object manager 106 is a "daemon" program and an instance of the manager 106 is run on each host device in the system. The data object manager 106 is configured to send instructions to the data store cluster 104 with respect to reconfig operations to be performed. Managing the performance of the reconfig operations 110-112 also includes obtaining the background I/O bandwidth limit 120 from the data store cluster 104 in order to determine the capacity of the cluster 104 for handling new reconfig operations.

The reconfig operation queue 108 of the data object manager 106 includes hardware, firmware, and/or software configured to temporarily store the reconfig operations 110-112 that are to be performed and/or data associated with the reconfig operations 110-112. The reconfig operations 110-112 may be stored in the queue 108 until they are initiated and/or performed on the cluster 104, at which point the data object manager 106 removes the initiated reconfig operations from the queue 108. In some examples, the queue 108 is a "first in, first out" (FIFO) structure, such that, as requested or proposed reconfig operations arrive at the data object manager 106, they are added to the "back" of the queue 108. When the data object manager 106 accesses a reconfig operation 110 from the queue 108 to determine whether to initiate it, the manager 106 accesses the operation 110 from the "front" of the queue 108, such that the operation that has been in the queue 108 the longest is the next operation to be accessed. Alternatively, the queue 108 may be configured to operate according to other data structure principles without departing from the description herein.

The reconfig operations 110-112 are operations that are automatically generated by the host device 102 for management of the data stored in the data store cluster 104 that is associated with hosted guest systems and/or other applications of the host device 102. The reconfig operations 110-112 are configured to reconfigure data objects in the data stores of the data store cluster 104, which may include copying data in a first data layout from a first data location to a second data location, where the data is arranged in a second data layout (e.g., the target object layout 114) in the second data location, and then releasing the storage space at the original data location. These operations may be performed for a variety of purposes, including to repair errors in the data cluster 104, to make space in particular data locations to enable maintenance tasks, to rebalance the way data is stored within the cluster 104 and/or within particular data stores, to account for changes to configuration settings of the cluster 104, and/or to account for policy changes and/or data layout changes to specific data objects (e.g., data objects 122-124). Reconfig operations may also be generated and/or initiated due to other events in the system 100 without departing from the description herein.

Each reconfig operation 110-112 includes data indicating how the reconfig operation is to be performed, including current data location or locations, a location or locations to which the data is to be moved, a data layout to be used when configuring the moved data in the location to which the data is moved, and a reconfig capacity value, which indicates the amount of data storage space that is occupied by the data to be moved. For instance, if the size of the data object to be reconfigured is 10 gigabytes (GB), the reconfig capacity value of the reconfig operation 110 is set to 20 GB, representing that, during the operation 110, the moved data is copied to the new location first, such that 20 GB will be occupied. It should be understood that the reconfig capacity value indicates the maximum amount of storage space occupied and that, after the process is complete, data storage space at the original location may be freed to be used, such that the data associated with the operation once again only occupies 10 GB. In other examples, where reconfiguration is performed on a series of batch portions of a data object as described herein, the reconfig capacity value of the reconfig operation 110 is set based on the size of the batch portions, rather than the total size of the data object. For instance, if the 10 GB object being reconfigured is reconfigured using 1 GB batch portions, the reconfig capacity value of the reconfig operation 110 is set to 11 GB (i.e., 10 GB for the size of the data object and 1 GB for the size of the batch portions that are copied and then released during the reconfiguration operation).

The reconfig limit 116 is configured to limit the number and/or size of reconfig operations that may be initiated by the data object manager 106. In some examples, the reconfig limit 116 is set to the same ratio or fraction as the background I/O bandwidth limit 120 of the data store cluster 104 as described herein. Alternatively, the reconfig limit 116 may be set to other values or otherwise defined without departing from the description herein.

The transient capacity value 118 of the data object manager 106 is a value that indicates an amount of data storage space that is temporarily occupied by reconfig operations that are currently being performed. The data object manager of each host device in the system 100 maintains an up-to-date transient capacity value 118 as reconfig operations and/or other background operations are initiated and completed, adding the reconfig capacity value of the operation to the transient capacity value 118 upon initiation and subtracting the reconfig capacity value from the transient capacity value 118 when the operation is completed and the original data storage space from which the data was copied during reconfiguration has been released or otherwise freed. The data object manager 106 is further configured to request or otherwise obtain the transient capacity values of other host devices in the system 100 in order to calculate a current total transient capacity value for the entire system 100. The total transient capacity value may be used to determine whether to initiate a reconfig operation as described herein.

In some examples, in order to determine whether a reconfig operation 110-112 in the queue 108 will be initiated and/or performed on the cluster 104, the data object manager 106 is configured to obtain the background I/O bandwidth limit 120, obtain current transient capacity values from other host devices, and obtain or otherwise determine an available capacity value of the data store cluster 104 and associated data stores that indicates how much data storage space thereon is currently free for use. The data object manager 106 is further configured to set the local reconfig limit 116 based on the obtained background I/O bandwidth limit 120 (e.g., setting the reconfig limit 116 to the same ratio or percentage value as the background I/O bandwidth limit 120).

Because the rate at which free data storage space on the cluster 104 is consumed is dependent on the relative amounts of I/O bandwidth that can be used to claim and write to the free data storage space to consume it, it should be understood that setting the reconfig limit 116 of the data object manager 106 equal to the background I/O bandwidth limit 120 establishes a limit that prevents the data object manager 106 from initiating reconfig operations on the cluster 104 that would consume free data storage space in such a way that inhibits the performance of user-facing applications or other applications on the system 100. For instance, when the limit 120 and, thus, the limit 116 are set to 20% maximum capacity for reconfig operations, the reconfig operations are enabled to use only 20% of the total I/O bandwidth to write to free space in the cluster 104, while other applications are enabled to use 80% of the total I/O bandwidth, such that the other applications may consume free space in the cluster at four times the rate that the reconfig operations use the free space. Thus, by limiting the free space capacity consumption to the same 20% ratio for determining whether initiate reconfig operations, the data object manager 106 or other data object managers associated with other host devices in the system 100 are configured to initiate reconfig operations at a rate that ensures that space occupied temporarily during reconfig operations does not interfere with the performance of other applications on the system.

In some examples, the data object manager 106 is configured to determine whether to initiate the next reconfig operation 112 in the queue 108 by comparing a sum of the reconfig capacity value of the reconfig operation 112 and the total transient capacity value of the cluster 104 (e.g., an amount of data storage space temporarily occupied by reconfig operations and/or other background operations) to a product of the total available capacity value of the cluster and the reconfig limit. Alternatively stated, the data object manager 106 compares the ratio of the transient capacity of the cluster 104 to the current available capacity of the cluster 104 to the reconfig limit 116, which is based on the background I/O bandwidth limit 120. If the transient capacity of the cluster 104, including the reconfig capacity value of the reconfig operation 112 to be initiated (e.g., the sum of values described above), is a fraction of the current available capacity value that is less than or equal to the reconfig limit 116, the current host data object manager 106 is configured to initiate the reconfig operation 112 on the data store cluster 104. Alternatively, if the reconfig operation 112 to be initiated would not fit within the reconfig limit 116, the data object manager 106 may be configured to delay the initiation of the reconfig operation 112 and/or otherwise handle the operation 112 as described herein. In alternative examples, the data values may be combined in other ways to determine whether to initiate a reconfig operation without departing from the description herein.

Each reconfig operation (e.g., reconfig operations 110-112) include a target object layout 114. Each data object 122-124 of the data store cluster 104 includes data arranged according to an object layout, which defines the data structure or structures used to store the data of a data object (e.g., data arrangements or organizations such as layers of redundant arrays of independent disks (RAID) volumes, RAID stripe-based volumes, RAID mirror-based volumes, concatenated volumes, or the like). The target object layout 114 of a reconfig operation defines the layout in which the data of a data object will be arranged after completion of the reconfig operation. For instance, if the reconfig operation includes a target object layout 114 defining pairs of data storage components that are mirrored and a concatenation layer referencing the pairs of components such that the data of the data object is stored in concatenated data sets across the pairs of components (e.g., a first data set of the data is stored in the first pair of components, a second data set of the data is stored in the second pair of components, etc.), the reconfig operation reconfigures the data object to include those features as described herein.

Figure 2A:
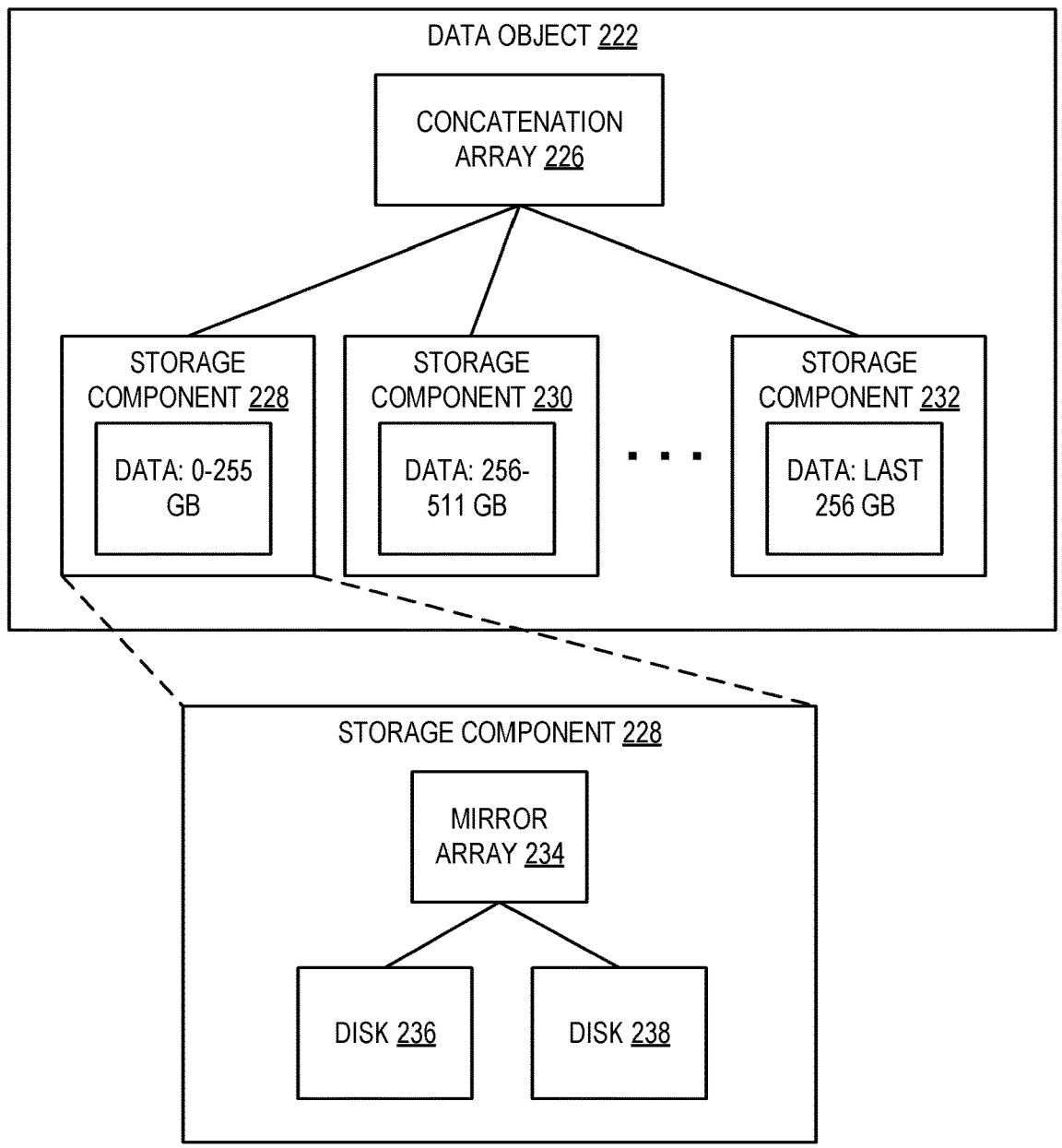
FIG. 2A-C are block diagrams illustrating a reconfiguration of a data object from a first object layout to a second object layout according to an embodiment.
Figure 2B:
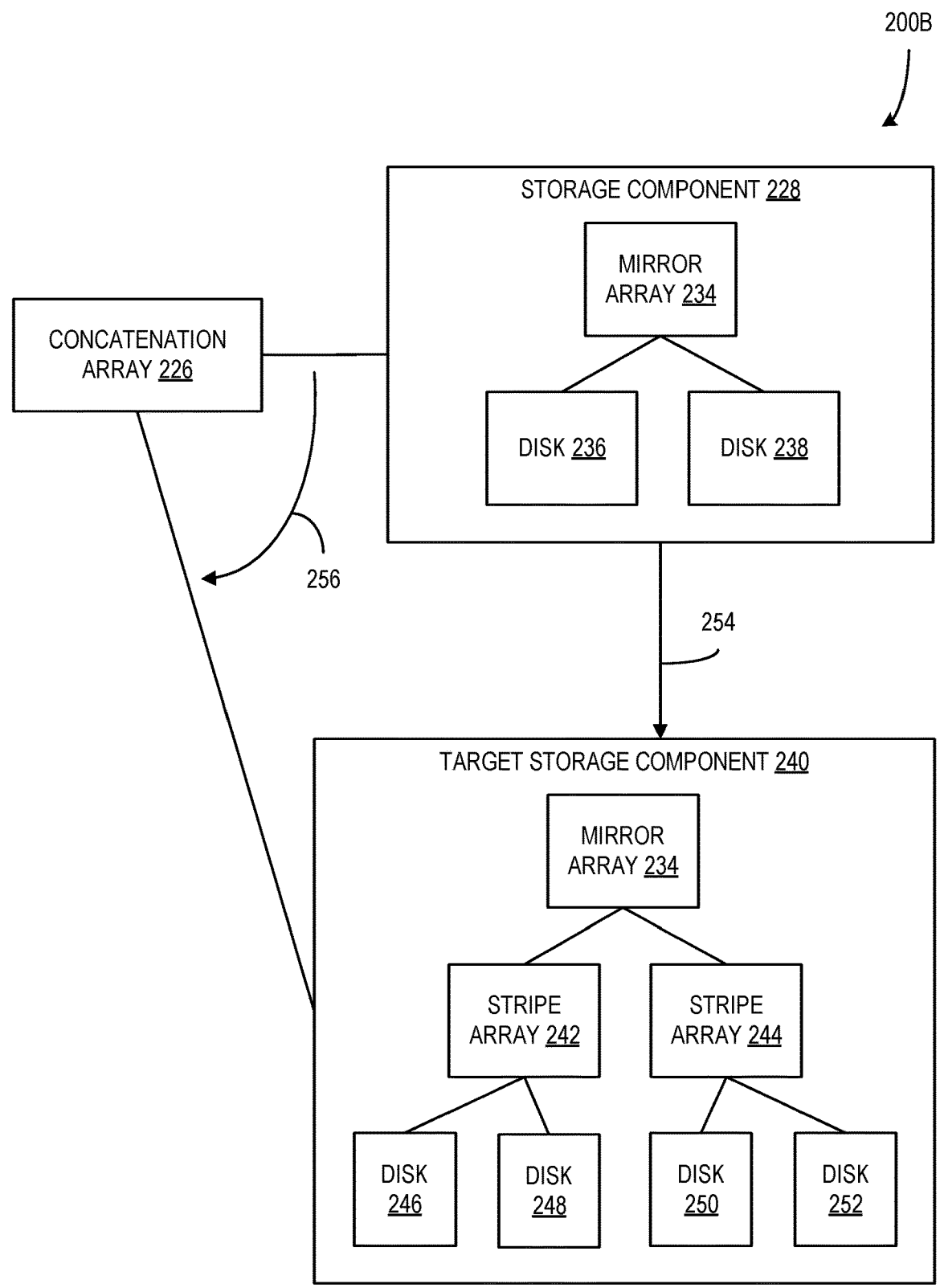
Figure 2C:
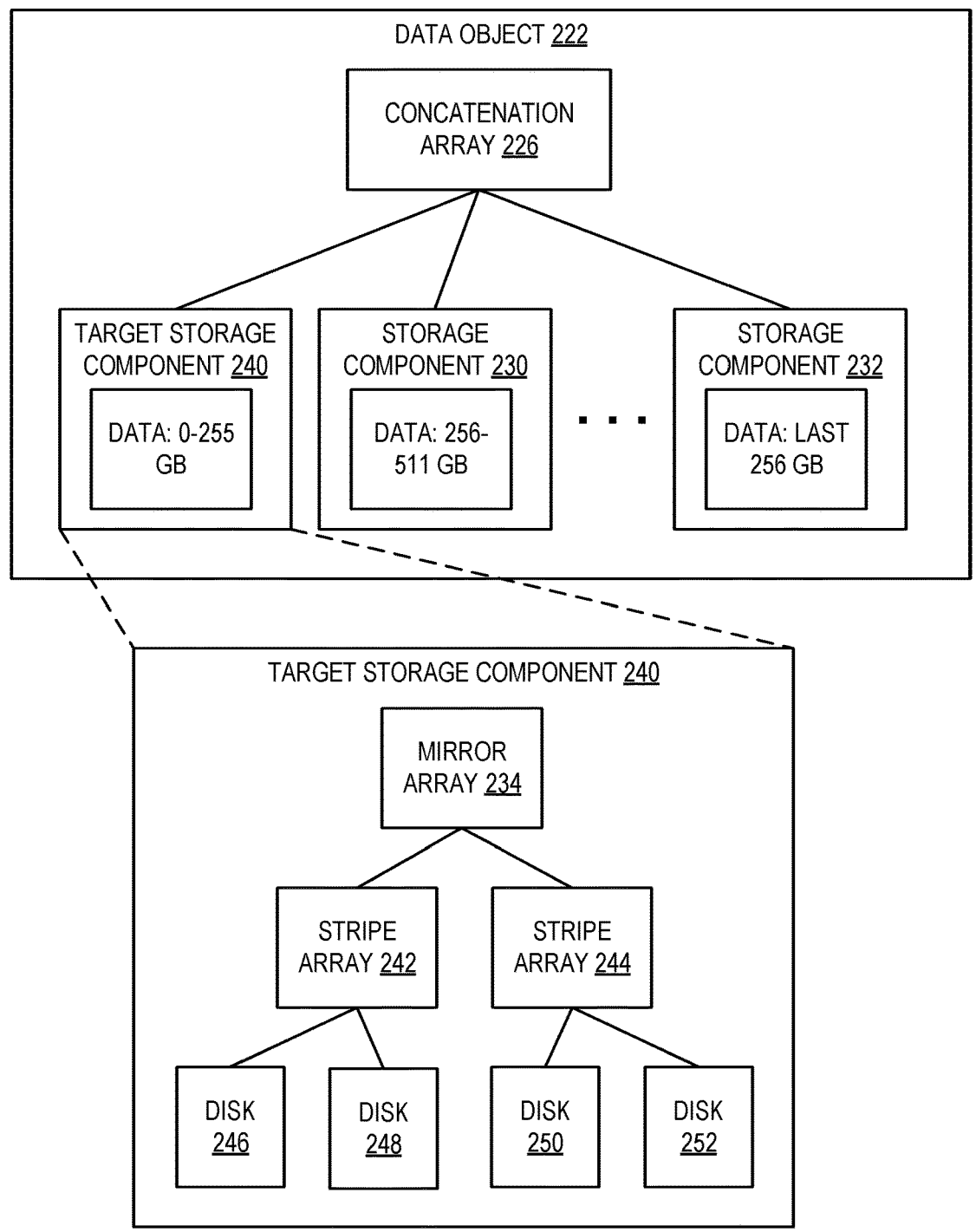

FIG. 2A-C are block diagrams illustrating a reconfiguration of a data object 222 from a first object layout as shown in diagram 200A to a second object layout as shown in diagram 200C according to an embodiment. In FIG. 2A, data object 222 is shown in a first layout including a concatenation array 226 and a plurality of storage components 228-232. Data stored in the data object 222 is stored across the plurality of storage components 228, 230, and 232 in a concatenated arrangement or organization (e.g., using a RAID 0 concatenative volume), as would be understood by a person of ordinary skill in the art. The concatenation array 226 is a layer or component that includes references to each of the storage components and is configured to direct or otherwise enable access to the data in the referenced storage components during input and/or output operations associated with the data object 222. In the illustrated example, the data object 222 is a one terabyte (TB) data object and the data is stored in subsets or portions in order on the plurality of storage components 228, 230, and 232. In this case, the first 256 GB of data is stored in the first storage component 228 (e.g., data in data locations from 0 to 255 GB), the second 256 GB of data is stored in the second storage component 230 (e.g., data in data locations from 256-511 GB), and the last 256 GB of data is stored in the last storage component 232. It should be understood that, while three storage components are shown in the illustrated example of diagram 200A, in other examples, more, fewer, and/or different storage components and/or arrangements of storage components may be used in the data object 222 without departing from the description herein.

Further, a layout or structure of the storage component 228 is illustrated, including a mirror array 234 and two associated disks 236 and 238. The mirror array 234 (e.g., a RAID 1 mirror volume) is a layer or component that includes references to each of the disks 236 and 238 and is configured to direct or otherwise enable access to the data stored on the referenced disks during input and/or output operations associated specifically with the storage component 228. The disks 236 and 238 include hardware, firmware, and/or software configured for storage of data and for handling input and/or output operations received through disk interfaces from the mirror array 234 and/or other components of the system. In some examples, the disks 236 and 238 are physical hard drives. Alternatively, or additionally, one or both of the disks 236 and 238 are virtual disks or otherwise include virtualized portions or components. Further, in other examples, the storage component 228 may include more, fewer, or different arrays and/or disks in different arrangement without departing from the description herein.

When a reconfig operation is performed on a data object to convert the data object to a new object layout, the data stored in the data object is preserved during the reconfiguration process. In FIG. 2B, a diagram 200B illustrates a reconfiguration operation being performed on the storage component 228 of the data object 222 according to the description herein. The reconfig operation includes an object layout that indicates that the storage components of the data object 222 should include a mirror array layer that mirrors two stripe arrays, each of which includes two disks upon which data is stored according to a stripe volume organization as would be understood by a person of ordinary skill in the art. The reconfig operation is performed on a batch portion of the components of the data object as described herein. In the illustrated case, the reconfig operation is performed on the storage component 228 specifically. First, a target storage component is created that includes a data structure based on the target object layout associated with the reconfig operation. For instance, the target storage component 240 is created with a mirror array 234 that references two stripe arrays 242 and 244 (e.g., RAID 0 stripe volumes), the stripe array 242 that references disks 246 and 248, and the stripe array 244 that references disks 250 and 252. It should be understood that, in other examples, different target storage components with different internal data structures may be created without departing from the description herein.

In some examples, the creation of the target storage component 240 requires free data storage space in the system to be allocated or otherwise claimed (e.g., data storage space of substantially the same capacity as the storage component 228 that is being reconfigured). Such data storage space allocation is considered transient capacity, in that the storage space occupied by the storage component 228 will eventually be released after reconfiguration of the storage component 228 is complete. The reconfig capacity value associated with the reconfig operation, as described above, includes the capacity of the data storage space allocated during creation of the target storage component 240. Further, for the purpose of tracking transient capacity associated with the data object and/or an associated host device or other component of the system, the capacity of data storage space occupied by the storage component 228 to be reconfigured may be flagged as "transient capacity" upon the initiation of the reconfiguration of the storage component 228.

After the target storage component 240 is created, the data stored in the storage component 228 (e.g., the data in disks 236 and 238) is copied to the target storage component 240 (e.g., the data is copied to the disks 246, 248, 250, and 252) at 254. In some examples, a "resynchronization operation" is performed on the storage component 228 and target storage component 240 to copy the underlying data, as would be understood by a person of ordinary skill in the art. It should be understood that copying the data from the storage component 228 to the target storage component 240 makes use of the interfaces and data structures of the respective storage components, such that data stored on the target storage component 240 is arranged according to the target object layout of the reconfig operation (e.g., the data of disk 236 is copied to the target storage component 240 such that it is stored across the disks 246 and 248 according to a stripe volume data structure—e.g., equally sized segments of the data are stored on each of the disks in an interleaved or round-robin manner so that the combined space of the two disks is made alternately from each component).

At 256, the reference that the concatenation array 226 maintains to the storage component 228 changes to refer to the target storage component 240, which now includes all of the data of the storage component 228 arranged according to the target object layout. The data of the storage component 228 has been preserved and the reconfiguration of the component 228 into the target storage component 240 is complete, so the data storage space occupied by the storage component 228 is released or otherwise freed for use by other components, objects, applications, or the like.

In FIG. 2C, a diagram 200C illustrates the data object 222 after the reconfig operation has completed the reconfiguration of the storage component 228 into the target storage component 240 as described above. In some examples, the reconfig operation is configured to continue reconfiguring storage components 230-232 to complete the reconfiguration of the data object 222 itself according to the target object layout. Each of the component reconfigurations may be performed one at a time or they may be performed in batches of more than one component at a time, depending on the configuration of the system (e.g., a reconfiguration threshold of the system may be configured to enable three of the storage components of the data object 222 to be reconfigured at once).

Further, it should be understood that, in other examples, data components arranged in different ways may be reconfigured according to reconfig operations as described herein without departing from the description. Additionally, in some examples, components to be reconfigured may be nested or layered inside of other components and the reconfig operations performed thereon may change or affect some or all layers of the various components. For instance, in some examples, a reconfig operation may only affect layers of components that are "below" the mirror array 234 of the storage component 228 (e.g., components that are referred to by the mirror array 234 and any components that may be referred to by those components). In that case, the reference between the concatenation array 226 and the storage component 228 may remain intact during reconfiguration, while the references from the mirror array 234 to other components may be changes based on changes made during the reconfig operation.

Figure 3:
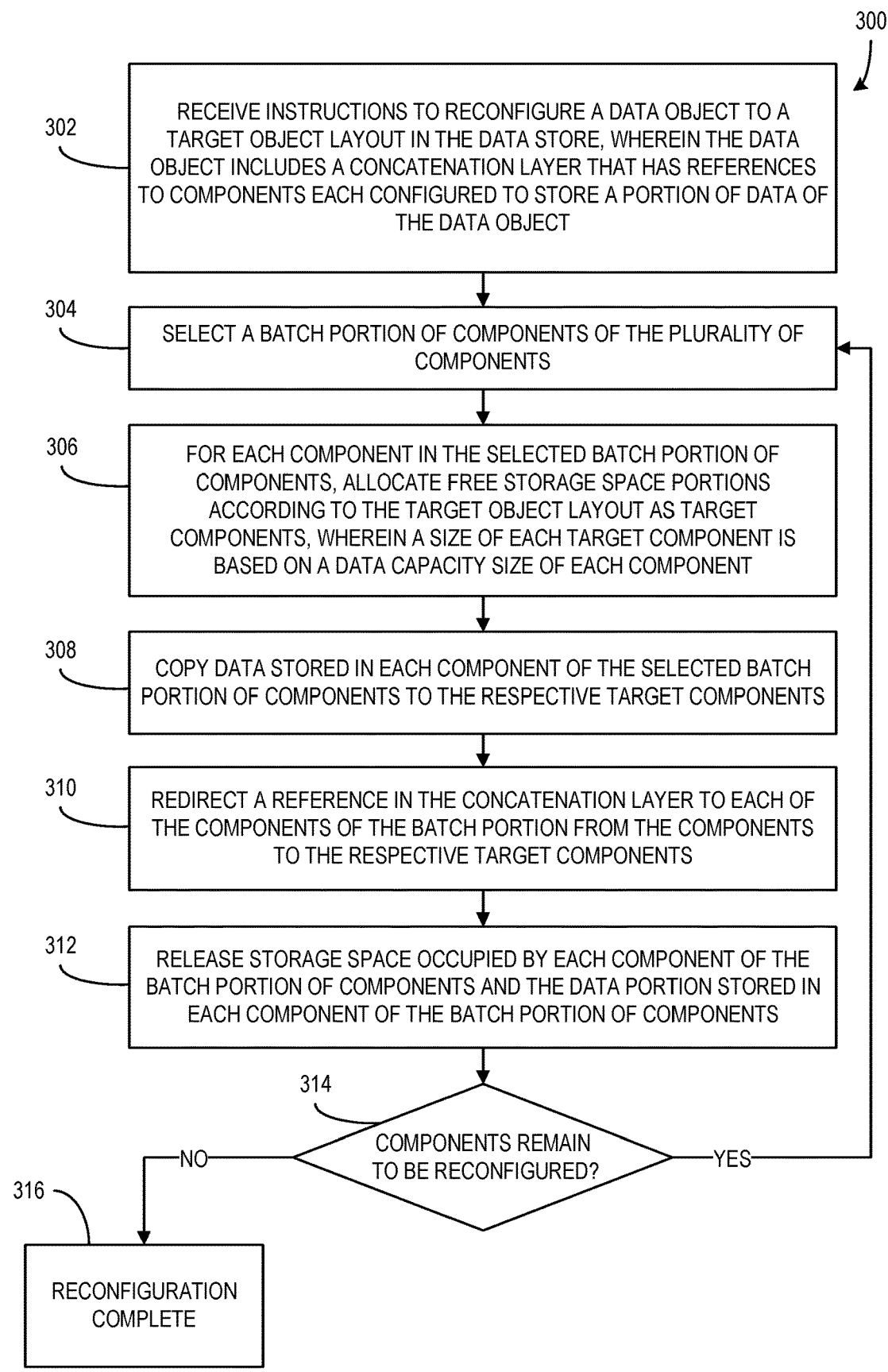
FIG. 3 is a flow chart illustrating a method of reconfiguring a data object in batches of data object components according to an embodiment.

FIG. 3 is a flow chart illustrating a method 300 of reconfiguring a data object in batches of data object components according to an embodiment. In some examples, the method 300 is performed by a component or components of a system such as system 100 of FIG. 1. At 302, instructions to reconfigure a data object to a target object layout in a data store are received. The data object to be reconfigured includes a concatenation layer that has references to a plurality of components and each component of the plurality of components is configured to store a portion of data of the data object. In some examples, a data object manager (e.g., data object manager 106) or similar component receives the instructions and is configured to handle the initiation and/or performance of a reconfig operation associated with the instructions. Further, it should be understood that the concatenation layer arrangement of the data object enhances or otherwise enables the manager component's effectiveness at performing the operations of method 300 as described herein. In other examples, where the data of the data object is distributed across a plurality of components in different arrangements (e.g., stripe volumes), the method 300 may be less effective at reducing storage space usage during the reconfiguration.

At 304, a batch portion of components of the plurality of components is selected. In some examples, batch portions are selected in an order based on the data location addresses stored on the associated components (e.g., each batch portion contains a component or components with the earliest data location addresses stored thereon). Alternatively, other batch portion component selection orders may be used without departing from the description herein. Further, one or more components of the plurality of components may be selected in a selected batch portion. In some examples, the number of components selected for a batch portion is based on a transient capacity limit of the data store and/or system as described above with respect to FIG. 1. Selected batch portions may be of substantially equal size and/or number of components throughout the method 300 or the size or number of components of selected batch portions may change throughout the described process (e.g., based on dynamic changes to the transient capacity of the system during the process).

At 306, for each component in the selected batch portion of components, free storage space portions are allocated according to the target object layout as target components, with one target component for each component of the selected batch portion. The size or data capacity of each target component is based on the size or data capacity of the respective associated component from the batch portion. For example, a component and target component are substantially the same size with respect to a quantity of data that can be stored, though slight differences may be introduced due to the target component being configured in a different object layout than the associated component.

At 308, the data stored in each component of the selected batch portion of components is copied to the respective target components. The copied data is stored in the respective target components in data structures that were created at 306 and comply with the target object layout, such that, while the copied data includes the same data content, it may be stored differently in the target component. For example, if the target object layout includes mirrored data storage components that are not present in the original components, data that was not redundantly mirrored in the original components may be redundantly mirrored in the associated target components.

At 310, a reference in the concatenation layer to each of the components of the batch portion is redirected from the components to the respective target components (e.g., redirection of the reference at 256 of FIG. 2 described above). Then, after the reference is redirected, at 312, memory storage space occupied by each component of the batch portion of components and the data portion stored in each component of the batch portion is released or otherwise freed for use by another application or entity of the system. As a result, the components of the batch portion have been replaced in the data object with the respective target components, which are configured according to the target object layout.

At 314, if there are components of the data object remaining to be reconfigured, the process returns to 304 to select a batch portion of components of the plurality of components that have not been reconfigured. Alternatively, if no components remain to be reconfigured, the reconfiguration of the data object is complete at 316. It should be understood that, during the processes of the method 300, only one batch portion of components are reconfigured at a given time, such that the amount of transient storage capacity that is occupied by the reconfig operation at any point is equal to the storage capacity of the batch portion of components.

Figure 4:
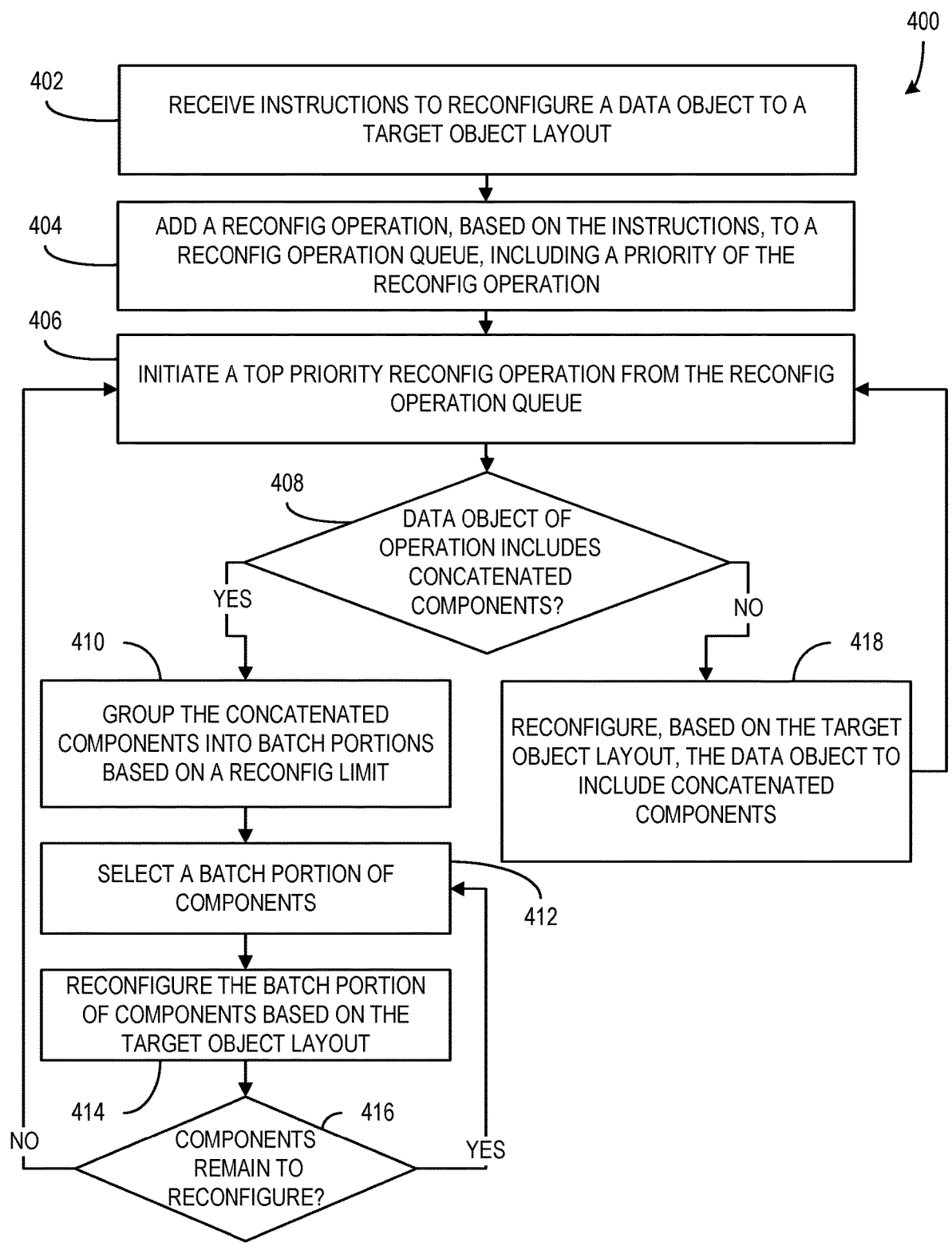
FIG. 4 is a flow chart illustrating a method of performing queued reconfiguration operations on data objects based on priority of the operations according to an embodiment.

FIG. 4 is a flow chart illustrating a method 400 of performing queued reconfiguration operations on data objects based on priority of the operations according to an embodiment. In some examples, the method 400 is performed by a component or components of a system such as system 100 of FIG. 1. At 402, instructions to reconfigure a data object (e.g., data object 122, 222) to a target object layout (e.g., target object layout 114) are received. At 404, a reconfig operation (e.g., reconfig operation 110) based on the received instructions is added to a reconfig operation queue (e.g., reconfig operation queue 108). In some examples, the reconfig operation is associated with a priority that is used to determine an order in which to perform the queued reconfig operations. The priority of the reconfig operation may be based on the type of operation or process that caused the reconfiguration instructions (e.g., a rebalancing process, a repair process, or a policy change process). The reconfig operation is associated with a reconfiguration type indicator that is used to determine the priority of the reconfig operation (e.g., a repair process type reconfig operation may have a higher priority than a policy change type reconfig operation).

At 406, the top priority reconfig operation from the reconfig operation queue is initiated. In some examples, the top priority reconfig operation is identified in the queue based on the process type that triggered the reconfiguration instructions as described above. Alternatively, or additionally, priority of the reconfig operations may be based on other factors, such as amount of time an operation has been in the queue, the specific data object and/or type of data object being reconfigured, or the like.

At 408, if the data object of the initiated operation includes a plurality of concatenated components (e.g., the concatenation array 226 and associated storage components 228-232), the process proceeds to 410, where the plurality of concatenated components are grouped into batch portions of components based on a reconfig limit (e.g., reconfig limit 116). Alternatively, if the data object does not include a plurality of concatenated components (e.g., the data object includes a different arrangement of components, such as mirrored components and/or components arranged as a stripe volume), the process proceeds to 418, where the data object is reconfigured based on the target object layout and to include a plurality of concatenated components. It should be understood that, in data objects without the concatenated components, the described reconfiguration of components in batch portions may not be effective and/or possible. For instance, if the components of the data object are configured to operate as a stripe volume, it may be necessary to reconfigure the data object all at once (e.g., allocating a target data object based on the target object layout, copying the data of the data object to the target data object, and releasing the data storage space of the original data object). Although reconfiguring the data object in this way is likely to be less efficient with respect to use of the transient storage capacity of the system during the reconfiguration, the data object is reconfigured to include the plurality of concatenated components, such that future reconfigurations may make use of the batch-based component reconfiguration operations described herein. After the data object is reconfigured at 418, the process returns to 406 to initiate another reconfig operation if there is an operation present in the queue.

Referring again to 410, the concatenated components of the data object are grouped into batch portions of components based on the defined reconfig limit. In some examples, a batch portion of the components of the data object is equal to one component. Alternatively, a batch portion may include a plurality of the components of the data object, up to and including all components of the data object. However, it should be understood that the use of larger batch portions of components reduces the efficiency of the transient storage capacity use during the reconfig operation. For instance, a 1 TB data object that is divided into ten 100 GB batch portions uses only 100 GB of transient storage capacity during reconfiguration of the components of the batch portions, while a 1 TB data object divided into two 500 GB batch portions uses 500 GB of transient storage capacity during reconfiguration of the components in its two batch portions.

At 412, a batch portion of components of the data object that has not been reconfigured is selected and, at 414, the batch portion of components is reconfigured based on the target object layout. It should be understood that the reconfiguration of the batch portion of components may be performed in substantially the same way as described above with respect to FIGS. 2A-2C and FIG. 3. At 416, if components of the data object remain that have not been reconfigured, the process returns to 412. Alternatively, if all of the batch portions of components of the data object have been reconfigured the process returns to 406 to initiate another reconfig operation if an operation is present in the queue.

Figure 5:
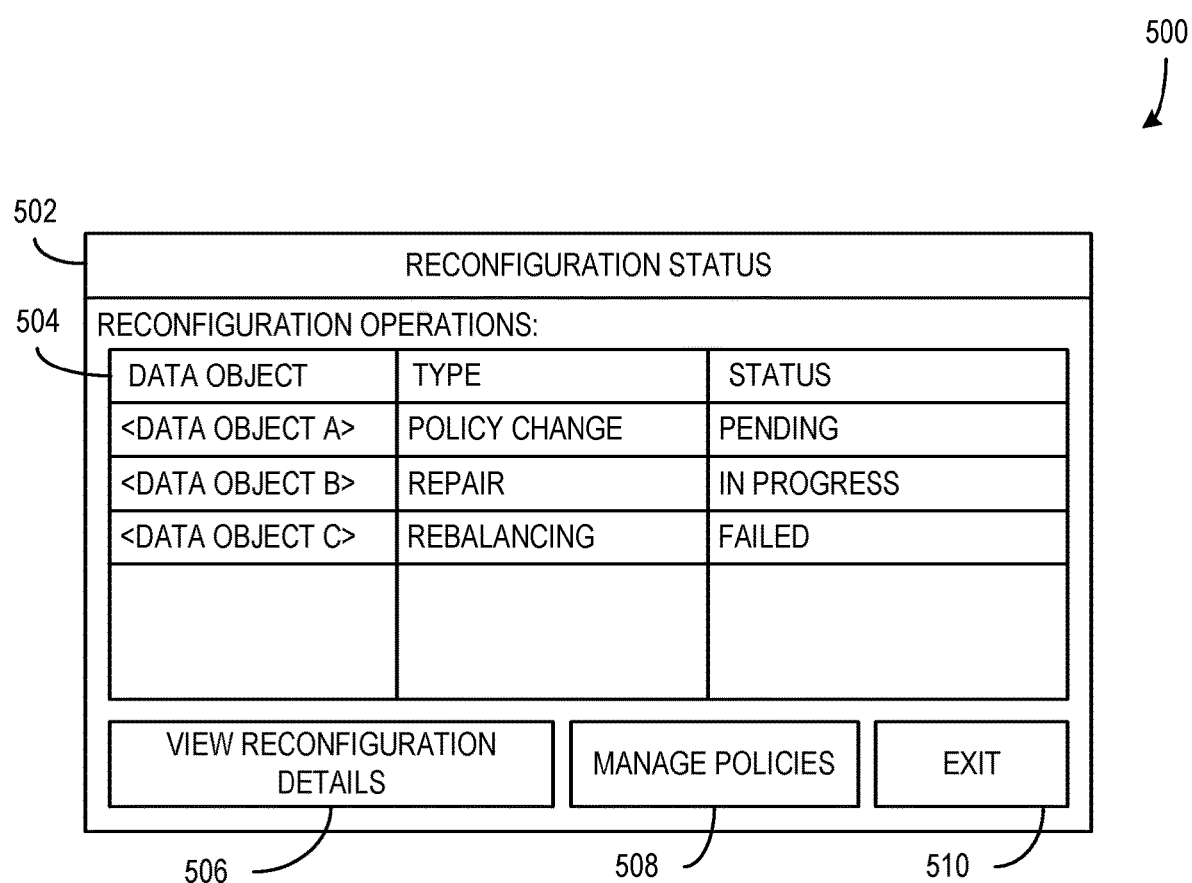
FIG. 5 is a block diagram illustrating a graphical user interface for displaying status information of reconfiguration operations in a system according to an embodiment.

FIG. 5 is a block diagram 500 illustrating a graphical user interface (GUI) 502 for displaying status information of reconfiguration operations in a system according to an embodiment. In some examples, the GUI 502 is configured for use with a system such as system 100 of FIG. 1 described above. The GUI 502 is configured to provide status information regarding reconfig operations that are currently pending, in process, or that have otherwise been initiated or added to the reconfig operation queue (e.g., reconfig operation queue 108). The GUI 502 includes a reconfiguration operation list 504 that displays information about reconfiguration operations of the system, including identifying the data object that is being reconfigured, the type of the reconfiguration, and the status of the operation.

As shown, the type of a reconfiguration may include a reconfiguration based on a policy change of the data object or data objects, a reconfiguration to repair a data object based on a detected flaw or malfunction in the data object, and/or a reconfiguration based on rebalancing the data object and/or rebalancing the use of storage space in the data store or cluster upon which the data object is scored. In other examples, other types or reasons for the reconfiguration operations may be used without departing from the description. Further, the status of the reconfiguration operations indicates a current state of the operations and possible states include a "pending" state (e.g., the reconfig operation has been added to the queue but has not been initiated), an "in progress" state (e.g., the reconfig operation has been initiated and is being performed), and a "failed" state (e.g., the reconfig operation has been initiated and it has failed for some reason, such as insufficient storage space). Other statuses may also be used, such as an "in progress but cannot complete" status indicating that the reconfig operation has stopped for some reason.

The GUI 502 also includes several buttons 506-510 configured to enable user interaction with the GUI 502. The buttons include a "view reconfiguration details" button 506, a "manage policies" button 508, and an "exit" button 510. In some examples, the view reconfiguration details button 506 is configured to enable a user to highlight a reconfiguration operation on the list 504 and view more detailed information associated with the highlighted operation. For instance, in the case of a failed operation, the button 506 may cause log information associated with the operation to be displayed, such that the user can view the log information to determine a cause of the failure of the operation. Alternatively, or additionally, the reconfiguration details displayed may include associated with the selected reconfiguration operation and/or with the system in general, such as the current transient capacity occupied by an in-progress operation and/or the current transient capacity and/or free space capacity of the system.

In some examples, the manage policies button 508 is configured to enable a user to access a data object policy management interface, such that the user can make changes to policies or otherwise manage policies based on the information provided by the GUI 502. Such management may include making changes to the object layouts of data objects of the system and/or rolling back policy changes or other reconfigurations to previous states (e.g., if a user determines that a recently reconfigured data object is malfunctioning or otherwise performing poorly, the user may decide to roll the data object back to a previous policy and/or object layout). Further, the exit button 510 enables the user to exit the reconfiguration status GUI 502.

Additional Example Scenarios

Aspects of the disclosure enable various additional scenarios, such as next described.

In an example, a data storage system includes a data store with several data objects stored thereon. A first data object is configured to include a concatenation array as a top layer that refers to twenty different storage components. The data of the first data object is stored in concatenated data sets across the twenty storage components. Each of the components has a storage capacity of ~100 GB and the first data object has a total storage capacity of ~2 TB.

A data storage policy change is made that includes an object layout change to the first data object to a target object layout. In this case, the target object layout configures the components as four separate subcomponents organized as a stripe volume layout across the four subcomponents. Instructions to reconfigure the first data object based on the target object layout are received at the object manager component of the data storage system based on the policy change. The object manager adds a reconfiguration operation associated with the first data object to a reconfig operation queue.

The object manager determines that the reconfiguration operation of the first data object is the top priority operation in the reconfig operation queue and, therefore, the manager initiates the operation. The components of the data object are grouped into batch portions based on the reconfig limit of the system. The object manager determines that the reconfig limit of the system allows for the batch portions to include two components of the data object (e.g., each batch portion is limited to ~200 GB storage space).

The reconfiguration operation begins by reconfiguring the first batch portion of components of the data object, or the first and second components of the data object. Target components of ~100 GB each are created for the first and second components of the first batch portion respectively by allocating free storage space of the data store and configuring the storage space based on the target object layout (e.g., a layout including the four subcomponents organized as a stripe volume). After the target components are created, the data of the first and second components are copied to the respective target components and stored within the data structures therein. References from the concatenation array of the data object referencing each of the first and second components are redirected to the respective target components and the storage space occupied by the first and second components is released.

After completing the reconfiguration of the first batch portion of components of the first data object, the remaining batch portions are reconfigured in the same way in a series. Once all of the batch portions of components have been reconfigured, the reconfiguration of the first data object is completed.

In a related example, a second data object configured as a stripe volume and lacking a concatenation array is also affected by the data storage policy change. Upon initiation of a reconfiguration operation associated with the second data object, it is determined that the data of the second data object is not concatenated and, as a result, batch portions of the components of the second data object cannot be effectively formed. A reconfiguration operation is performed on the second data object without the batching procedure described herein, and the resulting data object is configured according to the target object layout and it includes the concatenation array as a top layer, enabling the batching procedure to be used on the data object in future reconfigurations.

Exemplary Operating Environment

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker- .com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 6:
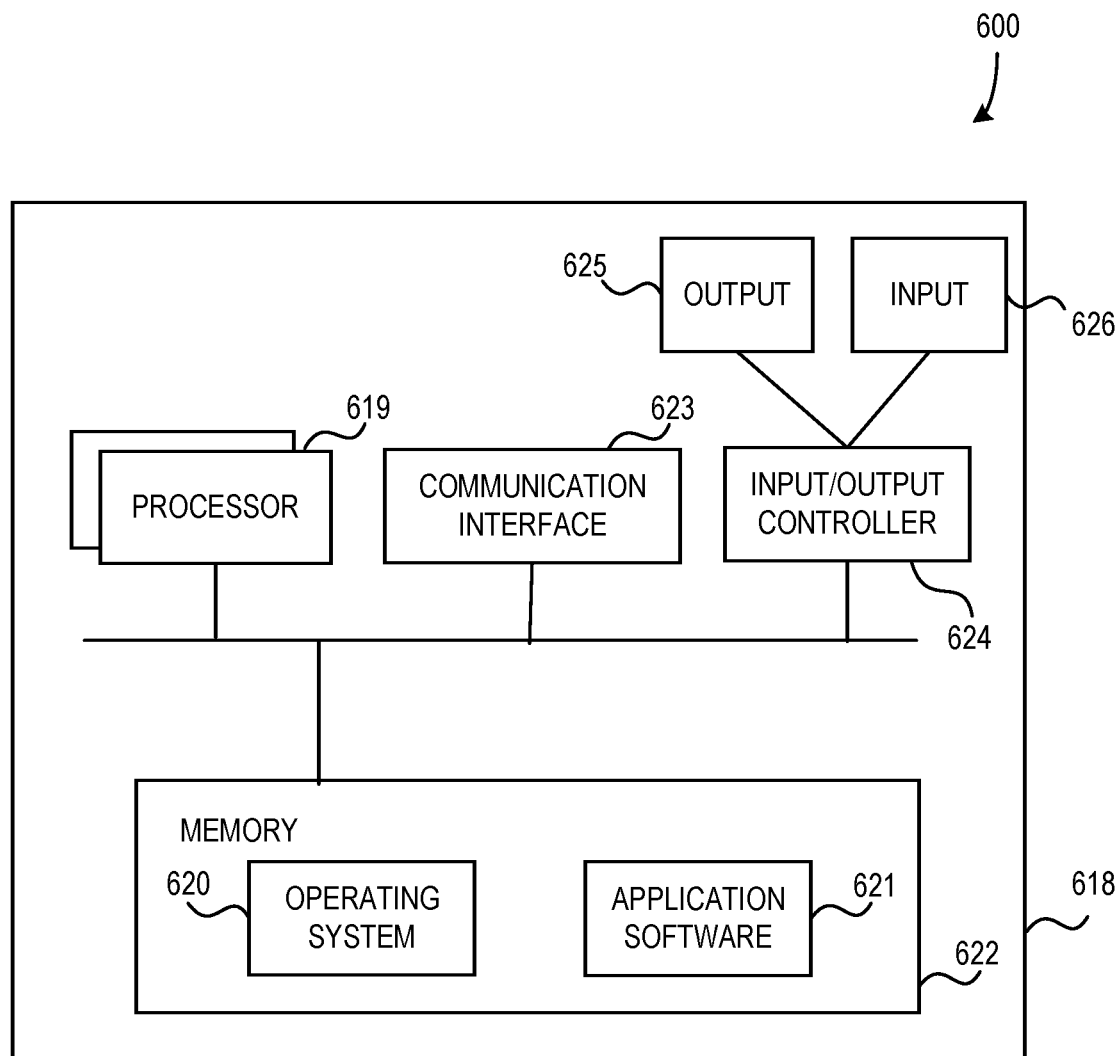
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, reconfiguring a data object by reconfiguring a series of batch portions of components of the data object as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: receive instructions to reconfigure a data object to a target object layout in the data store, wherein the data object includes a concatenation layer that has references to a plurality of components, wherein each component of the plurality of components is configured to store a portion of data of the data object; group the plurality of components into one or more batch portions of components; and reconfigure the one or more batch portions of components in a series based on the received instructions, wherein one of the batch portions of components is reconfigured at a time, the reconfiguring including, for each batch portion of components of the plurality of components: allocating a free storage space portions of the data store according to the target object layout as target components of the batch portion, wherein sizes of the target components are based on a data capacity sizes of the components of the batch portion of components; copying the portions of data stored in the components of the batch portion of components to the target components; redirecting references in the concatenation layer to the components of the batch portion of components from the components to the target components; and releasing storage space occupied by the components of the batch portion of components and the portions of data stored in the components; whereby storage space used as transient capacity during the reconfiguring is reduced to a storage space size of the batch portions.

A computerized method for reconfiguring a data object in a data store, the method comprises: receiving, by a processor, instructions to reconfigure a data object to a target object layout in the data store, wherein the data object includes a concatenation layer that has references to a plurality of components, wherein each component of the plurality of components is configured to store a portion of data of the data object; grouping, by the processor, the plurality of components into one or more batch portions of components; and reconfiguring, by the processor, the one or more batch portions of components in a series based on the received instructions, wherein one of the batch portions of components is reconfigured at a time, the reconfiguring including, for each batch portion of components of the plurality of components: allocating free storage space portions of the data store according to the target object layout as target components of the batch portion, wherein sizes of the target components are based on data capacity sizes of the components of the batch portion of components; copying the portions of data stored in the components of the batch portion of components to the target components; redirecting references in the concatenation layer to the components of the batch portion of components from the components to the target components; and releasing storage space occupied by the components of the batch portion of components and the portions of data stored in the components; whereby storage space used as transient capacity during the reconfiguring is reduced to a storage space size of the batch portions.

One or more non-transitory computer storage media having computer-executable instructions for reconfiguring a data object in a data store that, upon execution by a processor, cause the processor to at least: receive instructions to reconfigure a data object to a target object layout in the data store, wherein the data object includes a concatenation layer that has references to a plurality of components, wherein each component of the plurality of components is configured to store a portion of data of the data object; group the plurality of components into one or more batch portions of components; and reconfigure the one or more batch portions of components in a series based on the received instructions, wherein one of the batch portions of components is reconfigured at a time, the reconfiguring including, for each batch portion of components of the plurality of components: allocating free storage space portions of the data store according to the target object layout as target components of the batch portion, wherein sizes of the target components are based on data capacity sizes of the components of the batch portion of components; copying the portions of data stored in the components of the batch portion of components to the target components; redirecting references in the concatenation layer to the components of the batch portion of components from the components to the target components; and releasing storage space occupied by the components of the batch portion of components and the portions of data stored in the components; whereby storage space used as transient capacity during the reconfiguring is reduced to a storage space size of the batch portions.

Alternatively, or in addition to the other examples described herein, examples include any combination of the following:

wherein a size of the batch portions of components is based on a total transient capacity threshold of the data store.

wherein the size of the batch portions of components is a larger value of a minimum batch portion size value or a value that is a percentage of total free storage space of the data store.

wherein the size of the batch portions of components is less than or equal to a batch size limit based on an I/O bandwidth limit of the data store.

further comprising: determining, by the processor, that the data object is organized as a RAID 0 stripe volume across the plurality of components; and based on determining that the data object is organized as a RAID 0 stripe volume across a plurality of stripe volume-based components, converting the data object to a concatenation-based data object including the concatenation layer that has references to the plurality of components.

wherein the instructions include a reconfiguration type indicator that indicates at least one of a repair process type, a policy change process type, or a rebalancing process type, wherein each type is associated with a priority order value; and wherein, based on receiving multiple sets of instructions to reconfigure data objects in the data store, reconfiguring the data objects based on the received multiple sets of instructions are performed in a priority order based on the priority order values of the reconfiguration type indicators of the received multiple sets of instructions.

further comprising providing, by the processor, at least one of status data or progress data associated with reconfiguring the data object via a user interface.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for receiving, by a processor, instructions to reconfigure a data object to a target object layout in the data store, wherein the data object includes a concatenation layer that has references to a plurality of components, wherein each component of the plurality of components is configured to store a portion of data of the data object; exemplary means for grouping, by the processor, the plurality of components into one or more batch portions of components; and exemplary means for reconfiguring, by the processor, the one or more batch portions of components in a series based on the received instructions, wherein one of the batch portions of components is reconfigured at a time, the reconfiguring including, for each batch portion of components of the plurality of components: exemplary means for allocating free storage space portions of the data store according to the target object layout as target components, wherein sizes of the target components are based on data capacity sizes of the components of the batch portion of components; exemplary means for copying the portions of data stored in the components of the batch portion of components to the target components; exemplary means for redirecting references in the concatenation layer to the components of the batch portion of components from the components to the target components; and exemplary means for releasing storage space occupied by the components of the batch portion of components and the portions of data stored in the components; whereby storage space used as transient capacity during the reconfiguring is reduced to a storage space size of the batch portions.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for reconfiguring a data object in a data store, the system comprising:
   at least one processor; and
   at least one memory comprising computer program code, the at least one memory and the computer program code configured to, with the at least one processor, cause the at least one processor to:
   receive instructions to reconfigure a data object to a target object layout in the data store, wherein the data object includes a concatenation layer that has references to a plurality of storage components, wherein each storage component of the plurality of storage components is configured to occupy a storage space portion of the data store and to store a portion of data of the data object in the occupied storage space portion;
   group the plurality of storage components into one or more batch portions of storage components, wherein a storage space size of each batch portion is based on one or more of the following: a total transient capacity of the data store indicating an amount of storage capacity that is currently occupied by background processes, a value that is a percentage of total free storage space of the data store, and a background input/output (I/O) bandwidth limit of the data store; and
   reconfigure the one or more batch portions of storage components in a series based on the received instructions, wherein one of the batch portions of storage components is reconfigured at a time, wherein, during reconfiguring of each batch portion of storage components, references of the concatenation layer to the storage components of the batch portion are redirected based on the target object layout, whereby storage space used as transient capacity during the reconfiguring is reduced to the storage space size of the batch portions.

2. The system of claim 1, the at least one memory and the computer program code configured to, with the at least one processor, further cause the at least one processor to:

determine that the data object is organized as a RAID 0 stripe volume across the plurality of storage components; and based on determining that the data object is organized as a RAID 0 stripe volume across a plurality of stripe volume-based storage components, convert the data object to a concatenation-based data object including the concatenation layer that has references to the plurality of storage components.

3. The system of claim 1, wherein the instructions include a reconfiguration type indicator that indicates at least one of a repair process type, a policy change process type, or a rebalancing process type, wherein each type is associated with a priority order value; and wherein, based on receiving multiple sets of instructions to reconfigure data objects in the data store, reconfiguring the data objects based on the received multiple sets of instructions are performed in a priority order based on the priority order values of the reconfiguration type indicators of the received multiple sets of instructions.

4. The system of claim 1, the at least one memory and the computer program code configured to, with the at least one processor, further cause the at least one processor to provide at least one of status data or progress data associated with reconfiguring the data object via a user interface.

5. The system of claim 1, the at least one memory and the computer program code configured to, with the at least one processor, further cause the at least one processor to store the received instructions to reconfigure the data object in a reconfiguration operation queue as a queued reconfiguration operation, wherein reconfiguration operations stored in the reconfiguration operation queue are initiated in an order in which they are stored in the reconfiguration operation queue; and wherein grouping the plurality of storage components into one or more batch portions of storage components is based on the received instructions of the queued reconfiguration operation being initiated from the reconfiguration operation queue.

6. The system of claim 5, the at least one memory and the computer program code configured to, with the at least one processor, further cause the at least one processor to initiate the received instructions of the reconfiguration operation based on a sum of a reconfiguration capacity value of the reconfiguration operation and the total transient capacity of the data store being less than a product of a total available capacity of the data store and the background I/O bandwidth limit of the data store; and wherein the reconfiguration capacity value of the reconfiguration operation is defined as a sum of a size of the data object and the storage space size of a batch portion of storage component and wherein the background I/O bandwidth limit is defined as a percentage of I/O bandwidth associated with the data store.

7. The system of claim 6, wherein the total transient capacity of the data store is increased by the reconfiguration capacity value of the reconfiguration operation based on the initiation of the received instructions of the reconfiguration operation and the total transient capacity of the data store is decreased by the reconfiguration capacity value of the reconfiguration operation based on completion of the received instructions of the reconfiguration operation.

8. A computerized method for reconfiguring a data object in a data store, the method comprising:

receiving, by a processor, instructions to reconfigure a data object to a target object layout in the data store, wherein the data object includes a concatenation layer that has references to a plurality of storage components, wherein each storage component of the plurality of storage components is configured to occupy a storage space portion of the data store and to store a portion of data of the data object in the occupied storage space portion;

grouping, by the processor, the plurality of storage components into one or more batch portions of storage components, wherein a storage space size of each batch portion is based on one or more of the following: a total transient capacity of the data store indicating an amount of storage capacity that is currently occupied by background processes, a value that is a percentage of total free storage space of the data store, and a background input/output (I/O) bandwidth limit of the data store; and reconfiguring, by the processor, the one or more batch portions of storage components in a series based on the received instructions, wherein one of the batch portions of storage components is reconfigured at a time, wherein, during reconfiguring of each batch portion of storage components, references of the concatenation layer to the storage components of the batch portion are redirected based on the target object layout, whereby storage space used as transient capacity during the reconfiguring is reduced to the storage space size of the batch portions.

9. The computerized method of claim 8, the method further comprising:

determining, by the processor, that the data object is organized as a RAID 0 stripe volume across the plurality of storage components; and based on determining that the data object is organized as a RAID 0 stripe volume across a plurality of stripe volume-based storage components, converting the data object to a concatenation-based data object including the concatenation layer that has references to the plurality of storage components.

10. The computerized method of claim 8, wherein the instructions include a reconfiguration type indicator that indicates at least one of a repair process type, a policy change process type, or a rebalancing process type, wherein each type is associated with a priority order value; and wherein, based on receiving multiple sets of instructions to reconfigure data objects in the data store, reconfiguring the data objects based on the received multiple sets of instructions are performed in a priority order based on the priority order values of the reconfiguration type indicators of the received multiple sets of instructions.

11. The computerized method of claim 8, the method further comprising providing, by the processor, at least one of status data or progress data associated with reconfiguring the data object via a user interface.

12. The computerized method of claim 8, further comprising storing the received instructions to reconfigure the data object in a reconfiguration operation queue as a queued reconfiguration operation, wherein reconfiguration operations stored in the reconfiguration operation queue are initiated in an order in which they are stored in the reconfiguration operation queue; and wherein grouping the plurality of storage components into one or more batch portions of storage components is based on the received instructions of the queued reconfiguration operation being initiated from the reconfiguration operation queue.

13. The computerized method of claim 12, further comprising initiating the received instructions of the reconfiguration operation based on a sum of a reconfiguration capacity value of the reconfiguration operation and the total transient capacity of the data store being less than a product of a total available capacity of the data store and the background I/O bandwidth limit of the data store; and wherein the reconfiguration capacity value of the reconfiguration operation is defined as a sum of a size of the data object and the storage space size of a batch portion of storage component and wherein the background I/O bandwidth limit is defined as a percentage of I/O bandwidth associated with the data store.

14. The computerized method of claim 13, wherein the total transient capacity of the data store is increased by the reconfiguration capacity value of the reconfiguration operation based on the initiation of the received instructions of the reconfiguration operation and the total transient capacity of the data store is decreased by the reconfiguration capacity value of the reconfiguration operation based on completion of the received instructions of the reconfiguration operation.

15. One or more non-transitory computer storage media having computer-executable instructions for reconfiguring a data object in a data store that, upon execution by a processor, cause the processor to at least:

receive instructions to reconfigure a data object to a target object layout in the data store, wherein the data object includes a concatenation layer that has references to a plurality of storage components, wherein each storage component of the plurality of storage components is configured to occupy a storage space portion of the data store and to store a portion of data of the data object in the occupied storage space portion;

group the plurality of storage components into one or more batch portions of storage components, wherein a storage space size of each batch portion is based on one or more of the following: a total transient capacity of the data store indicating an amount of storage capacity that is currently occupied by background processes, a value that is a percentage of total free storage space of the data store, and a background input/output (I/O) bandwidth limit of the data store; and reconfigure the one or more batch portions of storage components in a series based on the received instructions, wherein one of the batch portions of storage components is reconfigured at a time, wherein, during reconfiguring of each batch portion of storage components, references of the concatenation layer to the storage components of the batch portion are redirected based on the target object layout, whereby storage space used as transient capacity during the reconfiguring is reduced to the storage space size of the batch portions.

16. The one or more non-transitory computer storage media of claim 15, wherein the computer-executable instructions, upon execution by a processor, further cause the processor to at least:

determine that the data object is organized as a RAID 0 stripe volume across the plurality of storage components; and based on determining that the data object is organized as a RAID 0 stripe volume across a plurality of stripe volume-based storage components, convert the data object to a concatenation-based data object including the concatenation layer that has references to the plurality of storage components.

17. The one or more non-transitory computer storage media of claim 15, wherein the instructions include a reconfiguration type indicator that indicates at least one of a repair process type, a policy change process type, or a rebalancing process type, wherein each type is associated with a priority order value; and wherein, based on receiving multiple sets of instructions to reconfigure data objects in the data store, reconfiguring the data objects based on the received multiple sets of instructions are performed in a priority order based on the priority order values of the reconfiguration type indicators of the received multiple sets of instructions.

18. The one or more non-transitory computer storage media of claim 15, wherein the computer-executable instructions, upon execution by a processor, further cause the processor to at least provide at least one of status data or progress data associated with reconfiguring the data object via a user interface.

19. The one or more non-transitory computer storage media of claim 15, wherein reconfiguring the one or more batch portions of storage components in a series based on the received instructions includes, for each batch portion of storage components of the plurality of storage components:

allocating free storage space portions of the data store according to the target object layout as target storage components of the batch portion, wherein sizes of the target storage components are based on data capacity sizes of the storage components of the batch portion of storage components;

copying the portions of data stored in the storage components of the batch portion of storage components to the target storage components; and redirecting references in the concatenation layer to the storage components of the batch portion of storage components from the storage components of the batch portion of storage components to the target storage components.

20. The one or more non-transitory computer storage media of claim 15, wherein the computer-executable instructions, upon execution by a processor, further cause the processor to at least store the received instructions to reconfigure the data object in a reconfiguration operation queue as a queued reconfiguration operation, wherein reconfiguration operations stored in the reconfiguration operation queue are initiated in an order in which they are stored in the reconfiguration operation queue; and wherein grouping the plurality of storage components into one or more batch portions of storage components is based on the received instructions of the queued reconfiguration operation being initiated from the reconfiguration operation queue.

* * * * *